US008863110B2

(12) United States Patent
Li et al.

(10) Patent No.: US 8,863,110 B2
(45) Date of Patent: Oct. 14, 2014

(54) FIRMWARE UPDATING SYSTEM AND METHOD

(75) Inventors: Ming Li, Shenzhen (CN); Xiao Liang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 449 days.

(21) Appl. No.: 13/221,866

(22) Filed: Aug. 30, 2011

(65) Prior Publication Data

US 2012/0246628 A1    Sep. 27, 2012

(30) Foreign Application Priority Data

Mar. 25, 2011    (CN) .......................... 2011 1 0073456

(51) Int. Cl.
*G06F 9/44*    (2006.01)
*G06F 9/445*    (2006.01)

(52) U.S. Cl.
CPC .. *G06F 8/65* (2013.01); *G06F 8/60* (2013.01); *G06F 9/44* (2013.01)
USPC ............ 717/168; 717/170; 717/173; 717/174

(58) Field of Classification Search
CPC ..................................... G06F 8/60; G06F 8/65
USPC .................................................. 717/168, 170
See application file for complete search history.

(56) References Cited

U.S. PATENT DOCUMENTS

| 5,577,244 | A | * | 11/1996 | Killebrew et al. | ............ 717/169 |
|---|---|---|---|---|---|
| 5,930,513 | A | * | 7/1999 | Taylor | ............ 717/174 |
| 7,555,657 | B2 | * | 6/2009 | Nasu | ............ 713/191 |
| 8,595,186 | B1 | * | 11/2013 | Mandyam et al. | ............ 707/632 |
| 8,621,054 | B2 | * | 12/2013 | Maruyama et al. | ............ 709/223 |
| 2003/0023966 | A1 | * | 1/2003 | Shimizu et al. | ............ 717/175 |
| 2003/0217193 | A1 | * | 11/2003 | Thurston et al. | ............ 709/321 |
| 2004/0187103 | A1 | * | 9/2004 | Wickham et al. | ............ 717/168 |
| 2005/0198620 | A1 | * | 9/2005 | Mathiske et al. | ............ 717/124 |
| 2007/0027506 | A1 | * | 2/2007 | Stender et al. | ............ 607/60 |
| 2008/0052698 | A1 | * | 2/2008 | Olson et al. | ............ 717/168 |
| 2009/0222650 | A1 | * | 9/2009 | Chen | ............ 713/1 |
| 2011/0239211 | A1 | * | 9/2011 | Kim et al. | ............ 717/178 |
| 2012/0124568 | A1 | * | 5/2012 | Fallon et al. | ............ 717/169 |

\* cited by examiner

*Primary Examiner* — Anna Deng
*Assistant Examiner* — Brahim Bourzik
(74) *Attorney, Agent, or Firm* — Novak Druce Connolly Bove + LLP

(57) ABSTRACT

A computing system and method updates firmware to a baseboard management controller (BMC) of a motherboard. The computing system updates firmware of the BMC according to the parameters, wherein the parameters includes a predetermined number of times to update the firmware of the BMC. The computing system counts a number of successful updates, in response to a determination that a current update of the firmware is successful. The computing system records information of each of the successful updates and generates a log file for storing the information, in response to a determination that counted number of the successful updates equal to the predetermined number of times.

12 Claims, 3 Drawing Sheets

FIRMWARE UPDATING SYSTEM AND METHOD

BACKGROUND

1. Technical Field

Embodiments of the present disclosure relate to information processing technology, and particularly to a firmware updating system and method.

2. Description of Related Art

A baseboard management controller (BMC) is a specialized microcontroller embedded in a motherboard of a computing system. The BMC manages interfaces between system management software and platform hardware. Each BMC includes a firmware. The firmware is a fixed program that internally controls the BMC. In order to improve original features or add new features of the BMC, the firmware of the BMC may need to be updated to a new version. Generally, a user may manually update the firmware. However, the BMC may need to be updated repeatedly to test stability of the BMC, which is not convenient to the user and results in low efficiency. Improved methods of updating the firmware of the BMC are desired.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computing system-readable medium or other storage device. Some non-limiting examples of non-transitory computing system-readable media include CDs, DVDs, BLU-RAY, flash memory, and hard disk drives.

Figure 1:
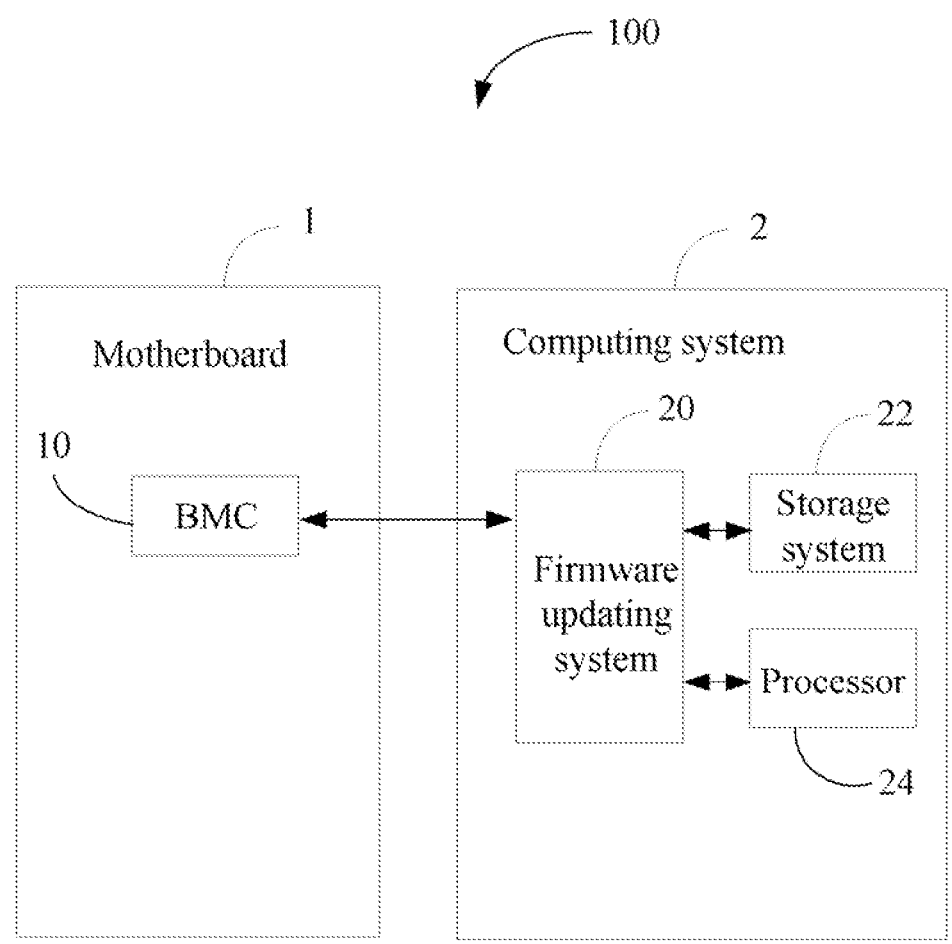
FIG. 1 is a system view of one embodiment of a firmware updating system.

FIG. 1 is a system view of one embodiment of a firmware updating system 100. In one embodiment, the firmware updating system 100 may include a motherboard 1 and a computing system 2. The motherboard 1 includes a baseboard management controller (BMC) 10 and is connected to the computing system 2 via an interface (e.g., a universal serial bus port). The firmware updating system 100 may be used to test stability of BMC 10 by updating the firmware of the BMC 10 a predetermined number of times (e.g., four hundred times).

The computing system 2 includes a firmware updating unit 20. Additionally, the computing system 2 may be a personal computer (PC), a network server, or any item of other data-processing equipment. Further details of the firmware updating unit 20 will be described below.

Figure 2:
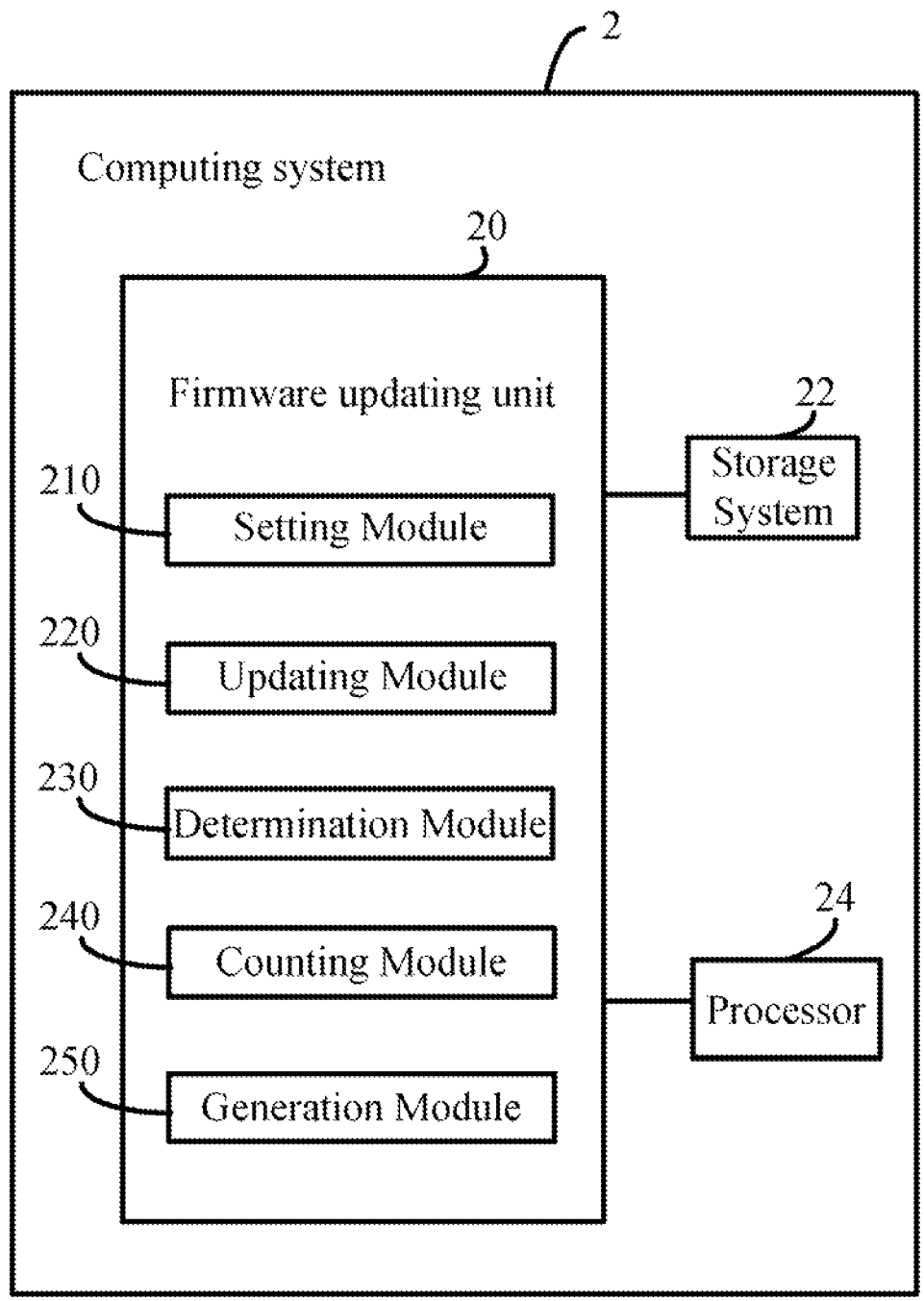
FIG. 2 is a block diagram of one embodiment of a computing system included in the FIG. 1.

FIG. 2 is a block diagram of one embodiment of the computing system 2 included in the FIG. 1. In one embodiment, the computing system 2 includes a storage system 22, and at least one processor 24. In one embodiment, the firmware updating unit 20 further includes a setting module 210, an updating module 220, a determination module 230, a counting module 240, and a generation module 250. The modules 210-250 may include computerized code in the form of one or more programs that are stored in the storage system 22. The computerized code includes instructions that are executed by the at least one processor 24 to provide functions for modules 210-250. The storage system 22 may be an EPROM, a flash, or a hard drive. In one embodiment, the storage system stores two or more versions of the firmware. For example, the two or more versions of the firmware may be, but are not limited to, 20A firmware or 21A firmware.

The setting module 210 sets parameters for updating firmware of the BMC 10. In one embodiment, the parameters include versions of the firmware (e.g., 20A firmware and 21A firmware), a predetermined number (e.g., four hundred times) of times to update firmware, a time interval (e.g., 2 minutes) between two consecutive updates, and a path directory for storing a log file generated by the BMC 10 during updating the firmware.

The updating module 220 updates the firmware according to the parameters. In one embodiment, the updating module 220 repeatedly updates the firmware using the two or more versions of the firmware at the time interval (e.g., every two minutes). The firmware updating unit 20 repeats writing the 20A firmware and the 21A firmware alternately.

The determination module 230 determines if a current update of the firmware is successful. In one embodiment, if a time between the two consecutive updates is equal to the set time interval, the current update is determined to be successful. For example, assuming that the 20A firmware is written to the BMC 10 at 10:00 AM, if the 21A firmware is written to the BMC 10 at 10:02 AM, then the time between writing the 20A firmware to the BMC 10 and writing the 21A firmware to the BMC 10 is equal to the set time interval, the current update that writing the 20A firmware to the BMC 10 is determined to be successful. Otherwise, if the interval between two consecutive updates is other than the predetermined time interval, the update is determined to be unsuccessful and the BMC 10 may be unstable. For example, if the current update that writing the 21A firmware to the BMC 10 is at other time (e.g., 10:03 AM), the update is determined to be unsuccessful.

The counting module 240 counts the number of the successful updates, in response to a determination that the current update is successful. In one embodiment, the counting module 240 may increase the number of the successful updates by one after every time the updating module 220 has updated the firmware in the BMC 10 successfully.

The determination module 230 determines if the counted number of the successful updates is equal to the predetermined number of the times.

The generating module 250 records information of each of the successful updates and generates a log file for storing the information, in response to a determination that the counted number of the successful updates is equal to the predetermined number. In one embodiment, the information of each of the successful updates includes a beginning time of each of the successful updates and a stop time of each of the successful updates. Additionally, the generation module 250 stores the log files into the storage system according to the path directory.

Figure 3:
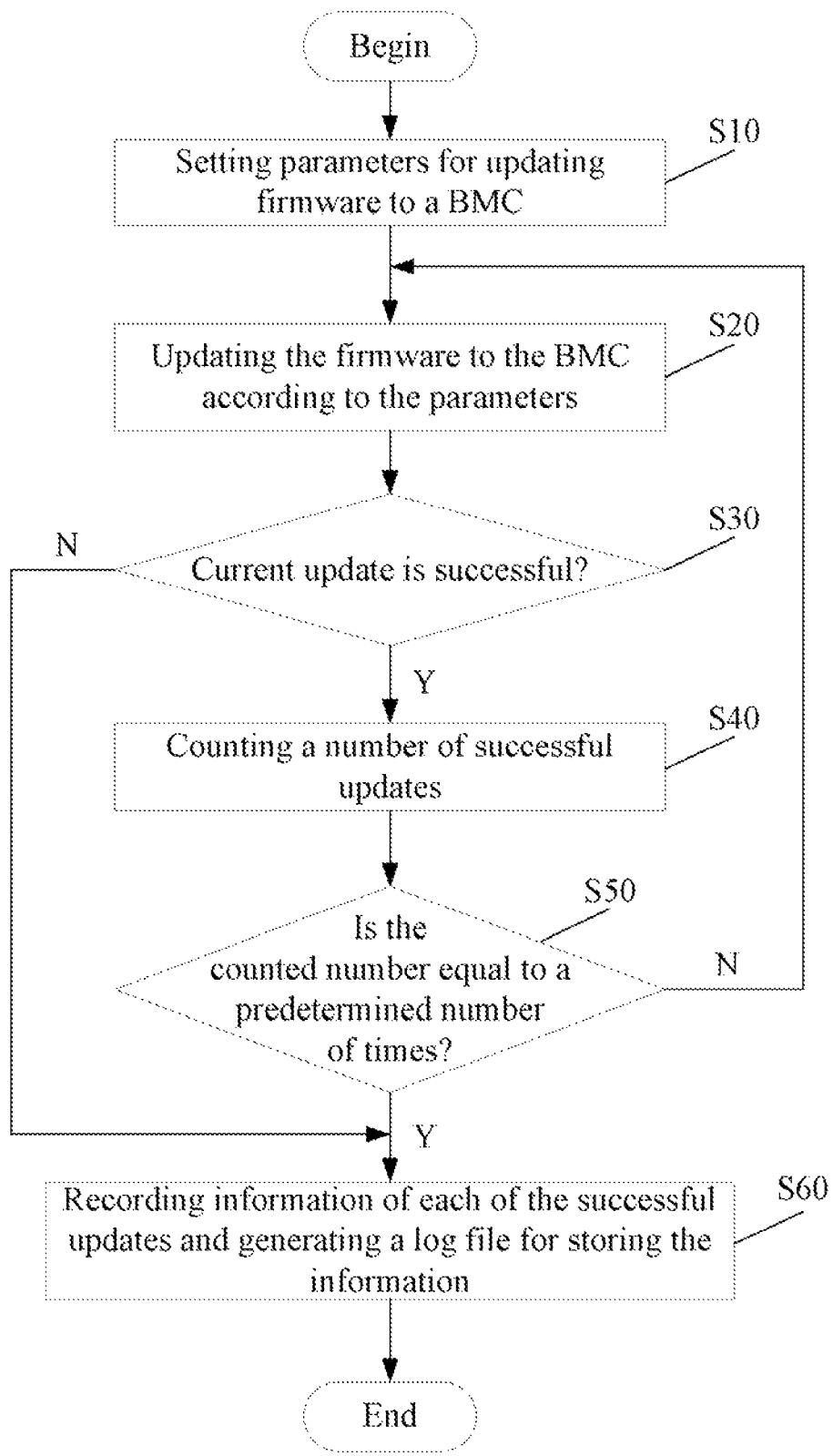
FIG. 3 is a flowchart of one embodiment of a firmware updating method.

FIG. 3 is a flowchart of one embodiment of a firmware updating method. Depending on the embodiment, additional blocks may be added, others deleted, and the ordering of the blocks may be changed.

In block S10, the setting module 210 sets parameters for updating firmware. In one embodiment, the parameters include versions of the firmware (e.g., 20A firmware and 21A firmware), a predetermined number (e.g., four hundred) of times to update the firmware, a time interval (e.g., 2 minutes) between two consecutive updates, and a path directory for storing a log file generated by the BMC 10 during updating the firmware.

In block S20, the updating module 220 updates the firmware according to the parameters. As mentioned above, the updating module 220 repeatedly updates the firmware using the two or more versions of the firmware at the time interval (e.g., every two minutes). For example, the updating module 220 writes 20A firmware of the BMC 10 at 10:00 AM, then replaces the 20A firmware by writing the 21A firmware to the BMC 10 at 10:02 AM, and also replaces the 21A firmware by writing the 20A firmware to the BMC 10 at 10:04 AM. The firmware updating unit 20 repeats writing the 20A firmware and the 21A firmware alternately.

In block S30, the determination module 230 determines if the current update of the firmware is successful. For example, assuming that the 20A firmware is written to the BMC 10 at 10:00 AM, if the 21A firmware is written to the BMC 10 at 10:02 AM, then the time between writing the 20A firmware to the BMC 10 and writing the 21A firmware to the BMC 10 is equal to the set time interval, the current update that writing the 20A firmware to the BMC 10 is determined to be successful, the procedure goes to block S40. Otherwise, if the 21A firmware is written to the BMC 10 at other time (e.g., 10:03 AM), the current update that writing the 20A firmware to the BMC 10 is determined to be unsuccessful, the procedure goes to block S60.

In block S40, counting module 240 counts a number of successful updates. As mentioned above, the counting module 240 may increase the number of successful updates by one when the updating module 220 successfully updates the firmware of the BMC 10 a time.

In block S50, the determination module 230 determines if the counted number of the successful updates is equal to the predetermined number of the times. For example, if the counted number of the successful updates is 400 and the predetermined number is 400, then the counted number of the successful updates is equal to the predetermined number, the procedure goes to block S60. Otherwise, if the counted number of the successful updates is 350 and the predetermined number is 400, then the counted number of the successful updates is unequal to the predetermined number, the procedure returns to block S20.

In block S60, the generating module 250 records information of each of the successful updates and generating a log file for storing the information, in response to a determination that the counted number of the successful updates is equal to the predetermined number. As mentioned above, the information of each of the successful updates includes a beginning time of each of the successful updates and a stop time of each of the successful updates. Additionally, if the path directory is A/B/C, the generation module 250 stores the log files into the storage system under the path directory A/B/C.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system, the computing system in electronic communication with a motherboard comprising:
    a storage system;
    at least one processor; and
    one or more programs stored in the storage system and being executable by the at least one processor, the one or more programs comprising:
        a setting module operable to set parameters for updating firmware to a baseboard management controller (BMC) of the motherboard, wherein the parameters comprise a predetermined number of times to update the firmware of the BMC and a time interval between two consecutive updates;
        an updating module operable to update the firmware of the BMC according to the parameters;
        a determination module operable to determine whether a current update of the firmware is successful, the current update being determined to be successful upon a condition that a time between the two consecutive updates is equal to the set time interval between two consecutive updates;
        a counting module operable to calculate a number of successful updates, in response to a determination that the current update is successful; and
        a generating module operable to record information of each of the successful updates and generate a log file for storing the information, in response to a determination that the counted number of the successful updates is equal to the predetermined number of the times.

2. The computing system of claim 1, wherein the parameters comprise two or more versions of the firmware, and a path directory for storing the log file generated by the BMC during updating the firmware of the BMC.

3. The computing system of claim 2, wherein the updating module repeatedly updates the firmware of the BMC using the two or more versions of the firmware at the time interval.

4. The computing system of claim 1, wherein the information of each of the successful updates includes a beginning time of each of the successful updates and a stop time of each of the successful updates.

5. A firmware updating method implemented by a computing system, the computing system in electronic communication with a motherboard, the method comprising:
    setting parameters for updating firmware to a baseboard management controller (BMC) of the motherboard, wherein the parameters comprises a predetermined number of times to update the firmware of the BMC and a time interval between two consecutive updates;
    determining whether a current update of the firmware is successful, the current update being determined to be successful upon a condition that a time between the two consecutive updates is equal to the set time interval between two consecutive updates;
    counting a number of successful updates, in response to a determination that the current update is successful; and
    recording information of each of the successful updates and generating a log file for storing the information, in response to a determination that the counted number of the successful updates is equal to the predetermined number of the times.

6. The method of claim 5, wherein the parameters comprise two or more versions of the firmware, and a path directory for storing the log file generated by the BMC during updating the firmware of the BMC.

7. The method of claim 6, wherein the updating module repeatedly updates the firmware of the BMC using the two or more versions of the firmware at the time interval.

8. The method of claim 5, wherein the information of each of the successful updates includes a beginning time of each of the successful updates and a stop time of each of the successful updates.

9. A non-transitory computing system-readable medium having stored thereon instructions that, when executed by a computing system, the computing system in electronic communication with a motherboard, causing the computing system to perform a firmware updating method, the method comprising:
   setting parameters for updating firmware to a baseboard management controller (BMC) of the motherboard, wherein the parameters comprises a predetermined number of times to update the firmware of the BMC and a time interval between two consecutive updates;
   updating the firmware of the BMC according to the parameters;
   determining whether a current update of the firmware is successful, the current update being determined to be successful upon a condition that a time between the two consecutive updates is equal to the set time interval between two consecutive updates
   counting a number of successful updates, in response to a determination that the current update is successful; and
   recording information of each of the successful updates and generating a log file for storing the information, in response to a determination that the counted number of the successful updates is equal to the predetermined number of the times.

10. The non-transitory medium of claim 9, wherein the parameters comprise two or more versions of the firmware, and a path directory for storing the log file generated by the BMC during updating the firmware of the BMC.

11. The non-transitory medium of claim 10, wherein the updating module repeatedly updates the firmware of the BMC using the two or more versions of the firmware at the time interval.

12. The non-transitory method of claim 9, wherein the information of each of the successful updates includes a beginning time of each of the successful updates and a stop time of each of the successful updates.

\* \* \* \* \*